United States Patent [19]

Ross

[11] Patent Number: 4,547,845
[45] Date of Patent: Oct. 15, 1985

[54] SPLIT-BUS MULTIPROCESSOR SYSTEM

[75] Inventor: Jerry H. Ross, Gulfport, Miss.

[73] Assignee: The United States of America as represented by the Secretary of the Navy, Washington, D.C.

[21] Appl. No.: 370,310

[22] Filed: Apr. 21, 1982

[51] Int. Cl.[4] .................. G06F 15/16; G06F 13/00
[52] U.S. Cl. .................................................. 364/200
[58] Field of Search ... 364/200 MS File, 900 MS File

[56] References Cited

U.S. PATENT DOCUMENTS

| | | | |
|---|---|---|---|
| 3,022,462 | 2/1962 | Keiper, Jr. | 329/126 |
| 3,571,786 | 3/1971 | Saling et al. | 340/2 |
| 3,731,262 | 5/1973 | Blake | 340/2 |
| 4,017,822 | 4/1977 | Rusch | 340/2 |
| 4,027,289 | 5/1977 | Toman | 364/900 |
| 4,168,531 | 9/1979 | Eichelberger et al. | 364/900 |
| 4,202,048 | 5/1980 | Edwards | 364/200 |
| 4,295,194 | 10/1981 | Darden et al. | 364/200 |
| 4,323,990 | 4/1982 | Goode et al. | 364/200 |

*Primary Examiner*—Eddie P. Chan
*Attorney, Agent, or Firm*—R. F. Beers; H. A. David

[57] ABSTRACT

A split-BUS multiprocessor system for acquiring data and outputting the data in digital computer format has an electronic front end that receives data from one or more sensors and converts the data to digital form. An acquisition microprocessor operating in a polling mode acquires the digital data and stores it in a data memory. An output microprocessor operating in an interrupt mode extracts the data from the data memory and routes it to appropriate display and recording devices in digital computer format.

3 Claims, 13 Drawing Figures

SPLIT-BUS MULTIPROCESSOR SYSTEM

BACKGROUND OF THE INVENTION

1. Field of the Invention.

The present invention relates to the aquisition and recording of data, and more particularly to a split-BUS multiprocessor system for acquiring and recording data in computer compatible digital form.

2. Description of the Prior Art.

In scientific field work, such as oceanographic research, sensors are used to collect data from a given environment. The data is in the form of a time varying analog signal which is often recorded for later detailed analysis. In some fields this data traditionally has been transformed manually into digital computer format for subsequent computer processing, resulting in an extremely cumbersome collection system with very limited capabilities subject to accuracy and analysis errors.

There have been some special systems using a single BUS multiprocessor technique with a single microprocessor, or a plurality of microprocessors under the control of a master microprocessor. In these applications of multiple microprocessors the address, data and control lines are common to each microprocessor. Each microprocessor is a discrete subsystem which is cabled together with other such subsystems to form an integral multiprocessor system.

SUMMARY OF THE INVENTION

Accordingly, the present invention provides a split-BUS multiprocessor system for acquiring data and outputting the data in digital computer format. An electronic front end receives data from one or more sensors and converts the data to digital form. An acquisition microprocessor operating in a polling mode acquires the digital data and stores it in a data memory. An output microprocessor operating in an interrupt mode extracts the data from the data memory and routes it to appropriate display and recording devices in digital computer format.

Therefore, it is an object of the present invention to provide a split-BUS multiprocessor system for acquiring sensor data and outputting it in digital computer format.

Another object of the present invention is to automate the manual transformation of data into digital computer format.

Yet another object of the present invention is to provide a self-contained system which requires no external cabling for discrete subsystems.

Other objects, advantages and novel features of the present invention will be apparent from the following detailed description when read in conjunction with the appended claims and attached drawing.

BRIEF DESCRIPTION OF THE DRAWING

FIG. 9a, 9b, 9c is a schematic diagram of the realtime clock of FIG. 8.

DESCRIPTION OF THE PREFERRED EMBODIMENT

Figure 1:
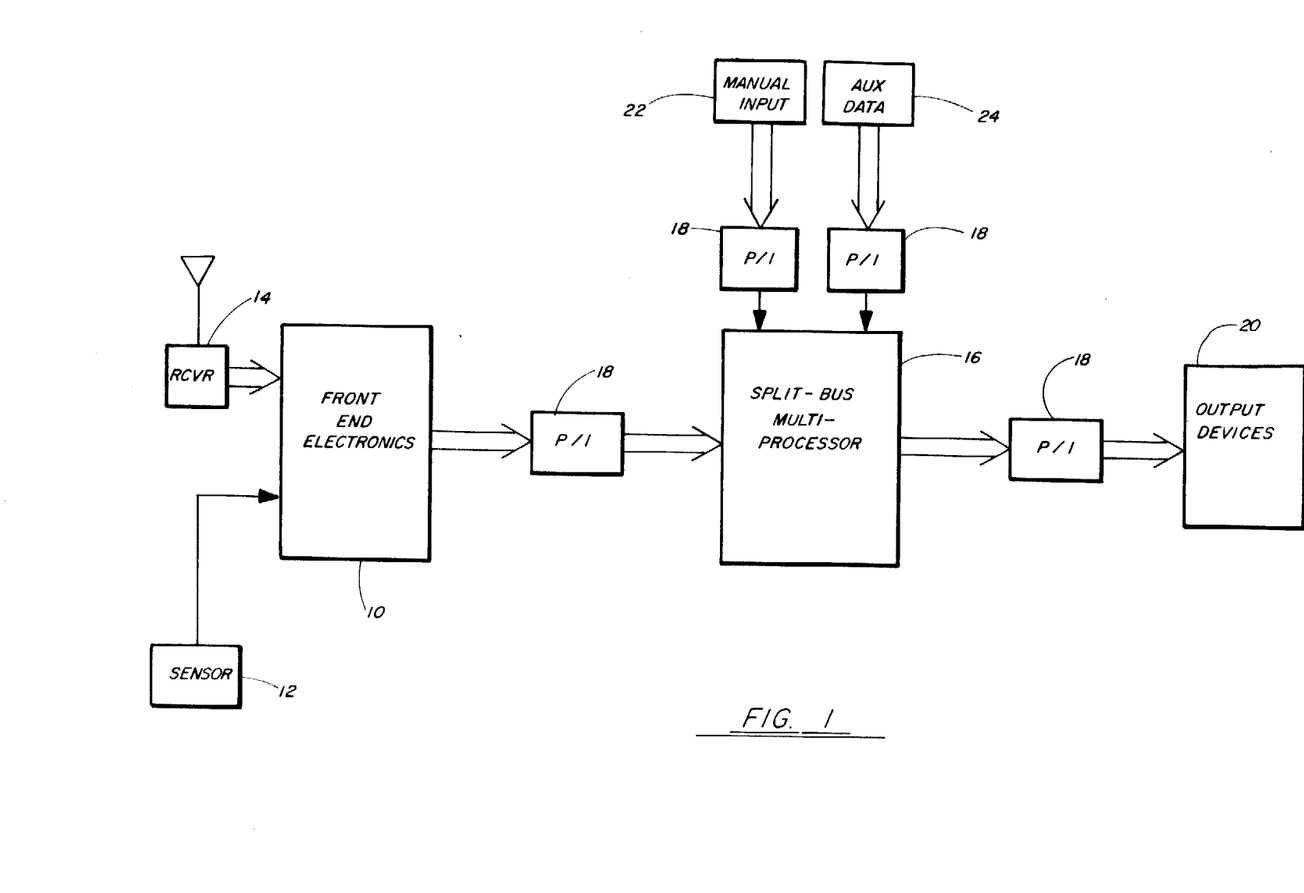
FIG. 1 is a block diagram of a system using a split-BUS multiprocessor system.

Referring now to FIG. 1 a front end electronics circuit 10 receives analog data either directly from a sensor 12 or via telemetry from a receiver 14. The data is processed and converted to digital data words. The digital data words are input to a split-BUS multiprocessor 16 via peripheral interface adaptors 18. The digital data words are formed into digital computer compatible messages and transmitted to output devices 20 via other peripheral interface adaptors 18 for display and/or recording and further processing. A manual input 22 provides operator control of the split-BUS multiprocessor, and an auxiliary data source 24 provides additional information to be collated with the digital data words.

Figure 2:
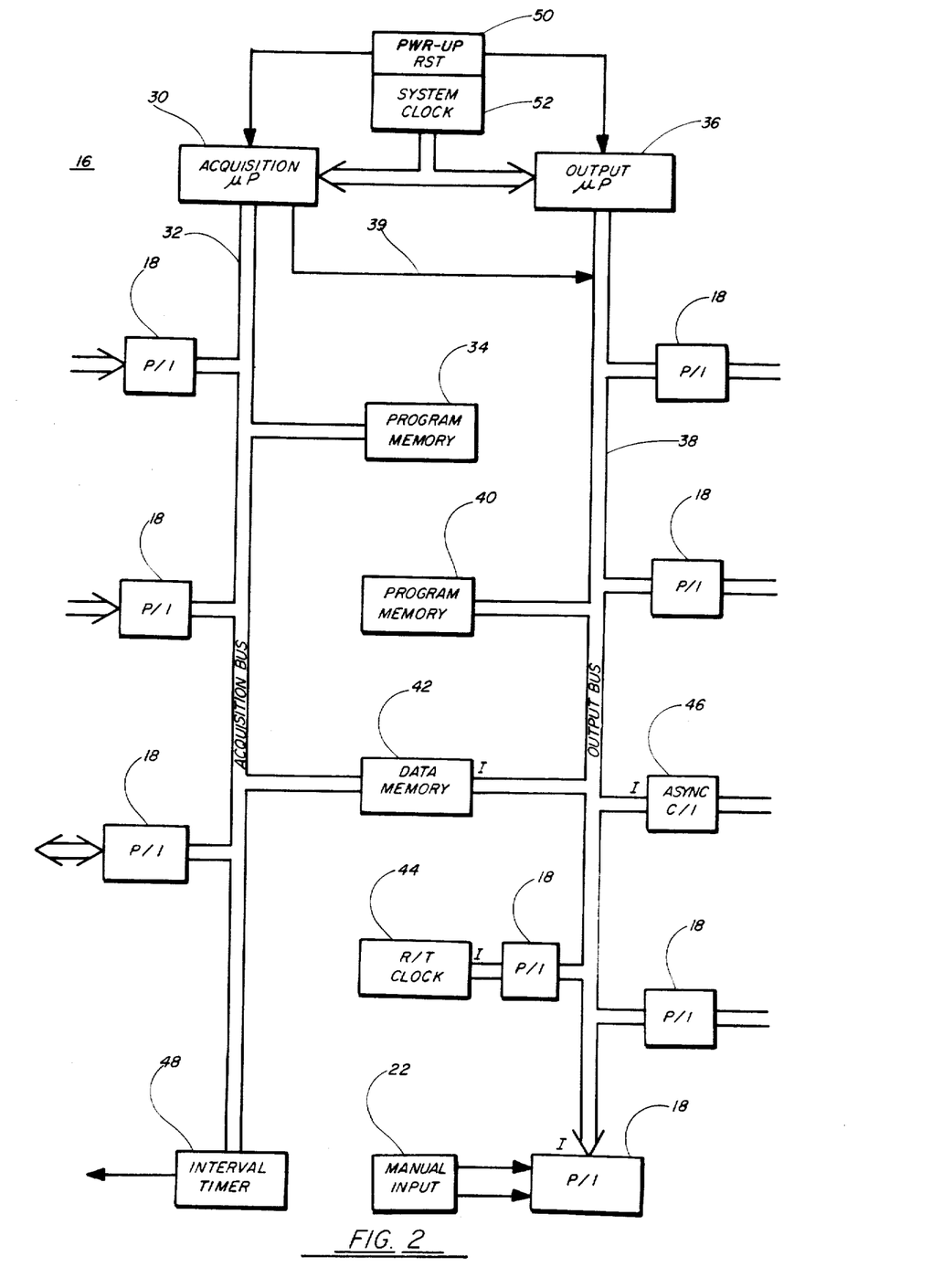
FIG. 2 is a block diagram of the split-BUS multiprocessor system.

The split-BUS multiprocessor 16 is shown in FIG. 2. An acquisition microprocessor 30 is tasked with the responsibility for acquiring the digital data words via the peripheral interface adaptors 18. The acquisition microprocessor 30 and peripheral interface adaptors are connected to an acquisition BUS 32. An acquisition program memory 34 also is connected to the acquisition BUS 32, and contains the firmware program for the acquisition microprocessor 30 in the form of a read-only memory and a scratchpad random access memory. The scratchpad portion of the acquisition program memory 34 provides for resident or local processing, analysis and flags for the acquisition microprocessor 30. The acquisition microprocessor 30 operates in a polling mode, sequentially accessing the devices on the acquisition BUS 32 and executing and processing the data from those devices which are ready.

An output microprocessor 36 is tasked with the responsibility for outputting the digital data words via peripheral interface adaptors 18. The output microprocessor 36 and peripheral interface adaptors 18 are connected to an output BUS 38. An output program memory 40 also is connected to the output BUS 38, and contains the firmware program for the output microprocessor 36 in the form of a read-only memory and a scratchpad random access memory. The scratchpad portion of the output program memory 40 provides for resident or local processing, analysis and flags for the output microprocessor 36. The output microprocessor 36 operates in an interrupt mode, accessing those devices which need service as they need it.

A data memory 42 provides a communications and data link between the microprocessors 30, 36. As data is received, the acquisition microprocessor 30 processes it and stores it in the data memory 42. When the data memory 42 has a complete message, an interrupt is sent to the output microprocessor 36. The output microprocessor 36 accesses the data memory 42 and processes the message for recording or transmission. A flag is then set in the data memory 42 to let the acquisition microprocessor 30 know when it next polls the memory that the memory is ready to receive data again. This is a systematic communication sequence that exists between the acquisition microprocessor 30 and the output microprocessor 36. The sequence is reversed when communication is from the output microprocessor 36 to the acquisition microprocessor, except that a flag is set in the data memory 42 by the output microprocessor rather than generating an interrupt.

A realtime clock 44 connected to the output BUS 38 provides a periodic interrupt to the output microprocessor 36 when data is being received. The time from the realtime clock 44 is incorporated with the data from the data memory 42 to document the data. An asynchronous communications interface 46, also connected to the output BUS 38, provides a means for communicating with external devices such as a computer.

An interval timer 48 connected to the acquisition BUS 32 is set by the acquisition microprocessor 30 when one of the peripheral interface adaptors 18 being polled provides a flag that data is being received. The interval timer 48 then controls the rate at which data is sampled from the input devices.

A power-up/reset circuit 50 resets the microprocessors 30, 36, peripheral interface adaptors 18 and the realtime clock 44 when power is applied to the system or when reset is commanded from the manual input 22. A system clock 52 provides timing for the microprocessors 30, 36. The particular system described uses a split-phase system clock 52 with the microprocessors 30, 36 driven out of phase to avoid BUS contention, caused when two devices try to access a single device at the same time, and to eliminate BUS arbitration, determining who gets control of the BUS, that is common with other multiprocessor systems.

Figure 3:
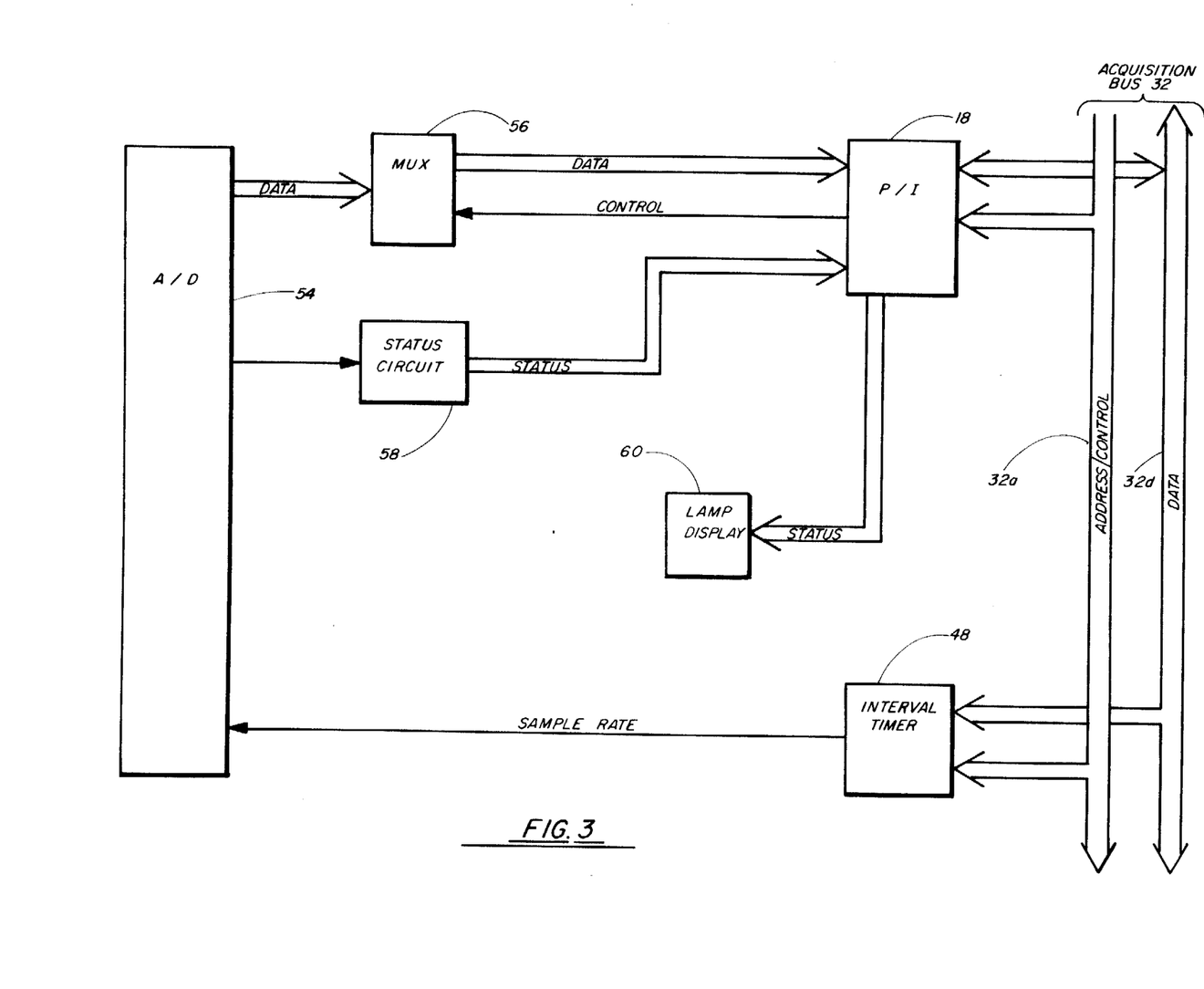
FIG. 3 is a block diagram of a representative input for the split-BUS multiprocessor system.

FIG. 3 is a typical data source. An analog-to-digital converter 54 converts analog data into parallel digital data words. The sampling rate of the A/D converter 54 is controlled by the interval timer 48, with the rate determined by the aquisition microprocessor 30 according to a preset value or an operator input via the manual input 22. The data from the A/D converter 54 is input to a multiplexer 56 under control of the acquisition microprocessor 30. A status circuit 58 provides status information about the data source via the A/D converter 54. The status information together with the digital data from the multiplexer 56 is sent to the peripheral interface adaptor 18. The status information flags the acquisition microprocessor 30 that data is being received. When the acquisition microprocessor 30 senses the flag in its polling sequence, it makes changes in the interval timer 48 sample rate as necessary and extracts the data for storage in the data memory 42. A lamp display 60 connected to the peripheral interface adaptor 18 provides the operator with a visual display of the status of the data input. The acquisition BUS 32 has two sub-BUSes: (1) a data BUS 32d which provides two-way data transfer with the acquisition microprocessor 30, and (2) an address/control BUS 32a by which the acquisition microprocessor accesses and controls each device on the BUS.

Figure 4:
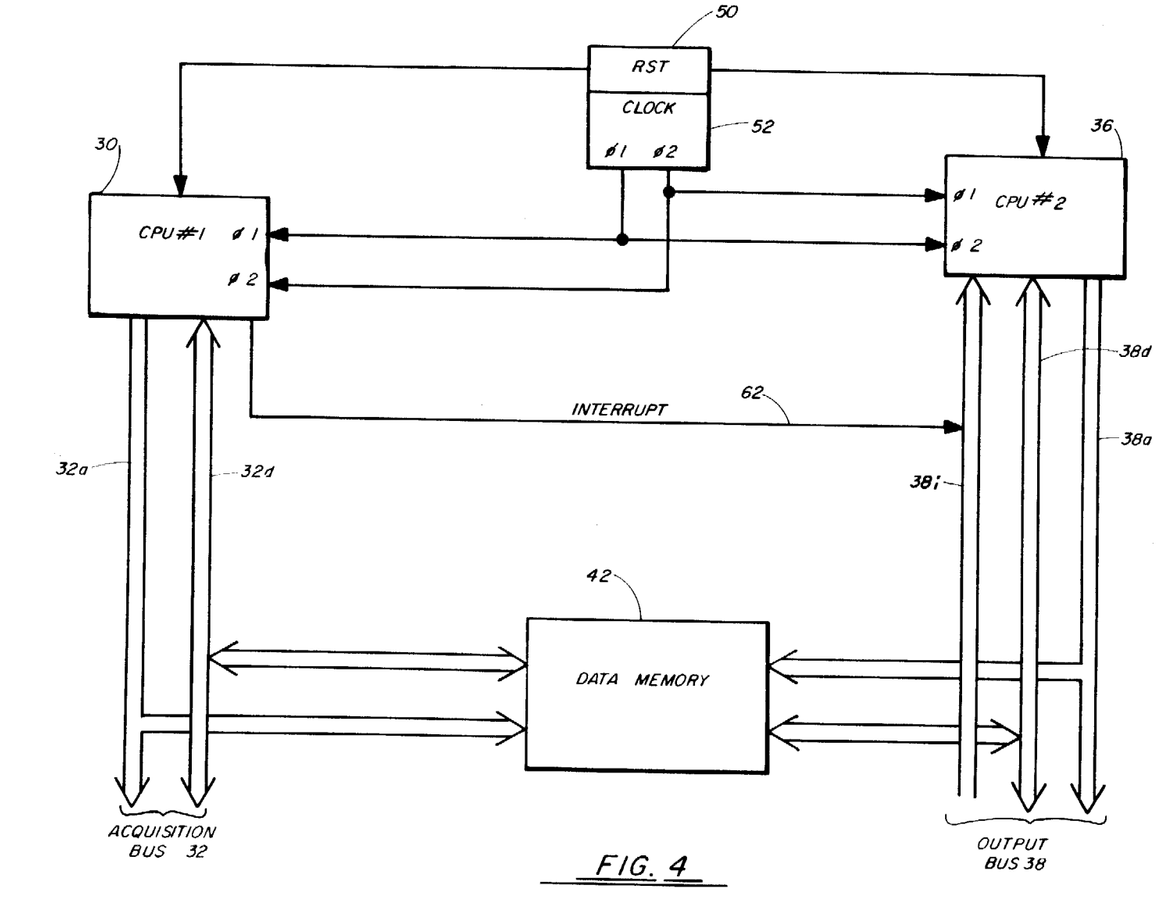
FIG. 4 is a block diagram of the microprocessors and data memory for the split-BUS multiprocessor system.

As is apparent in FIG. 4 the two microprocessors 30, 36 are driven in split-phase. ∅1 and ∅2 from the system clock 52 are connected to the ∅1 and ∅2 clock inputs of the acquisition microprocessor 30, respectively, while being connected to the ∅2 and ∅1 clock inputs of the output microprocessor 36, respectively. The output BUS 38 is subdivided into three sub-BUSes: (1) a data BUS 38d which provides two-way data transfer with the output microprocessor 36, (2) an address/control BUS 38a by which the output processor accesses and controls each device on the BUS, and (3) an interrupt BUS 38i by which devices on the BUS can interrupt the output microprocessor for immediate attention on a priority basis. Both microprocessors 30, 36 address the data memory 42 and communicate with each other through the data memory. The acquisition microprocessor 30 provides an interrupt 62 to the output microprocessor 36 when it wants to communicate with the output microprocessor. The output microprocessor 36 communicates with the acquisition microprocessor 30 by setting flags in the data memory 42 which the acquisition microprocessor senses when polling the data memory.

Figure 5:
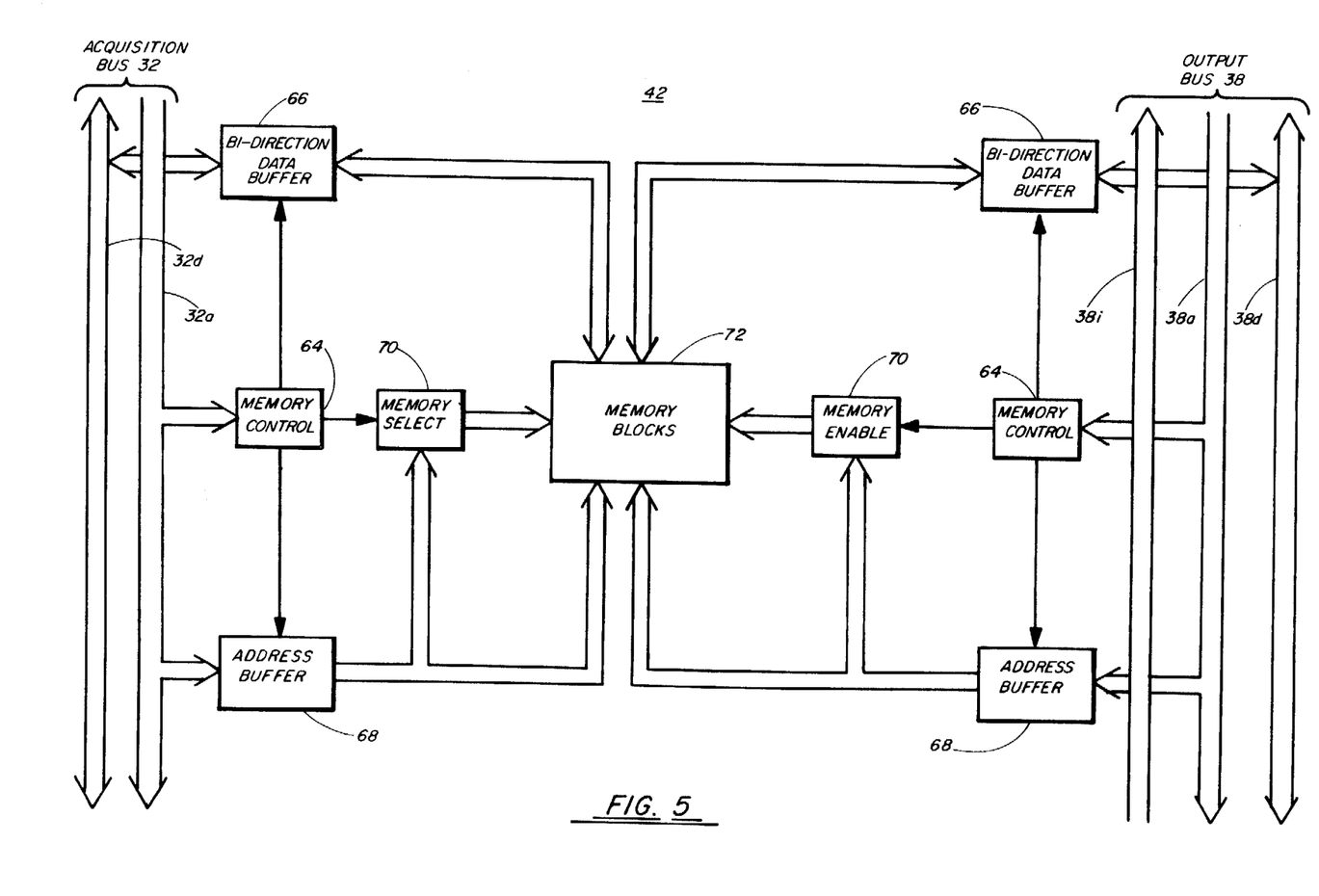
FIG. 5 is a detailed block diagram of the data memory for the split-BUS multiprocessor system.

The data memory 42 is shown in greater detail in FIG. 5. A memory control circuit 64 upon being accessed by one of the microprocessors 30, 36 enables a bi-directional data buffer 66, an address buffer 68, and a memory select circuit 70. A memory 72, which may consist of a plurality of memory blocks depending upon the memory capacity desired, is connected to the data buffer 66, address buffer 68 and memory select 70. The memory select circuit 70 selects the appropriate memory block where there is more than one. The address from the address buffer 68 selects the memory address within the memory block as well as commanding a read or write operation. Finally, the data buffer 66 transfers the data between the memory 72 and the data BUS 32d, 38d according to whether a write or read is commanded.

Figure 6:
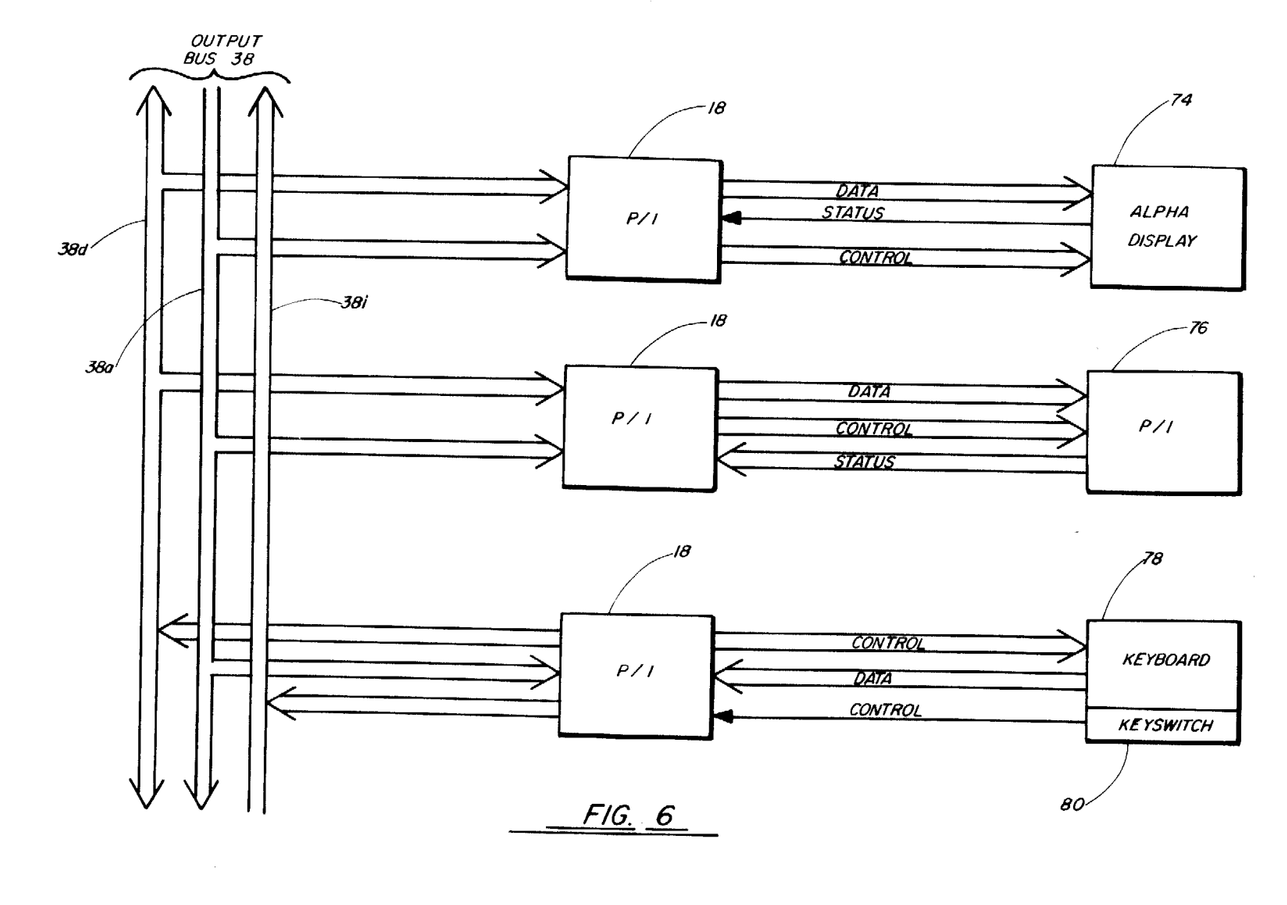
FIG. 6 is a block diagram of representative devices for the split-BUS multiprocessor system.

FIG. 6 shows typical output devices connected to the output BUS 38. The particular peripheral interface 18 is addressed by the output microprocessor 36, and data is transferred to or from the output device. Such a device may be an alphanumeric display 74 or a printer 76 for hardcopy. Additionally, a keyboard/keyswitch 78/80 provides operator interface with the microprocessors 30,36. The keyswitch 80 provides an interrupt and system reset, while the keyboard 78 enables the operator to interrupt the output microprocessor 36 to enter reference data into the scratchpad portion of the program memories 34,40 to modify the microprocessor programs, and to obtain information concerning the system.

Figure 7:
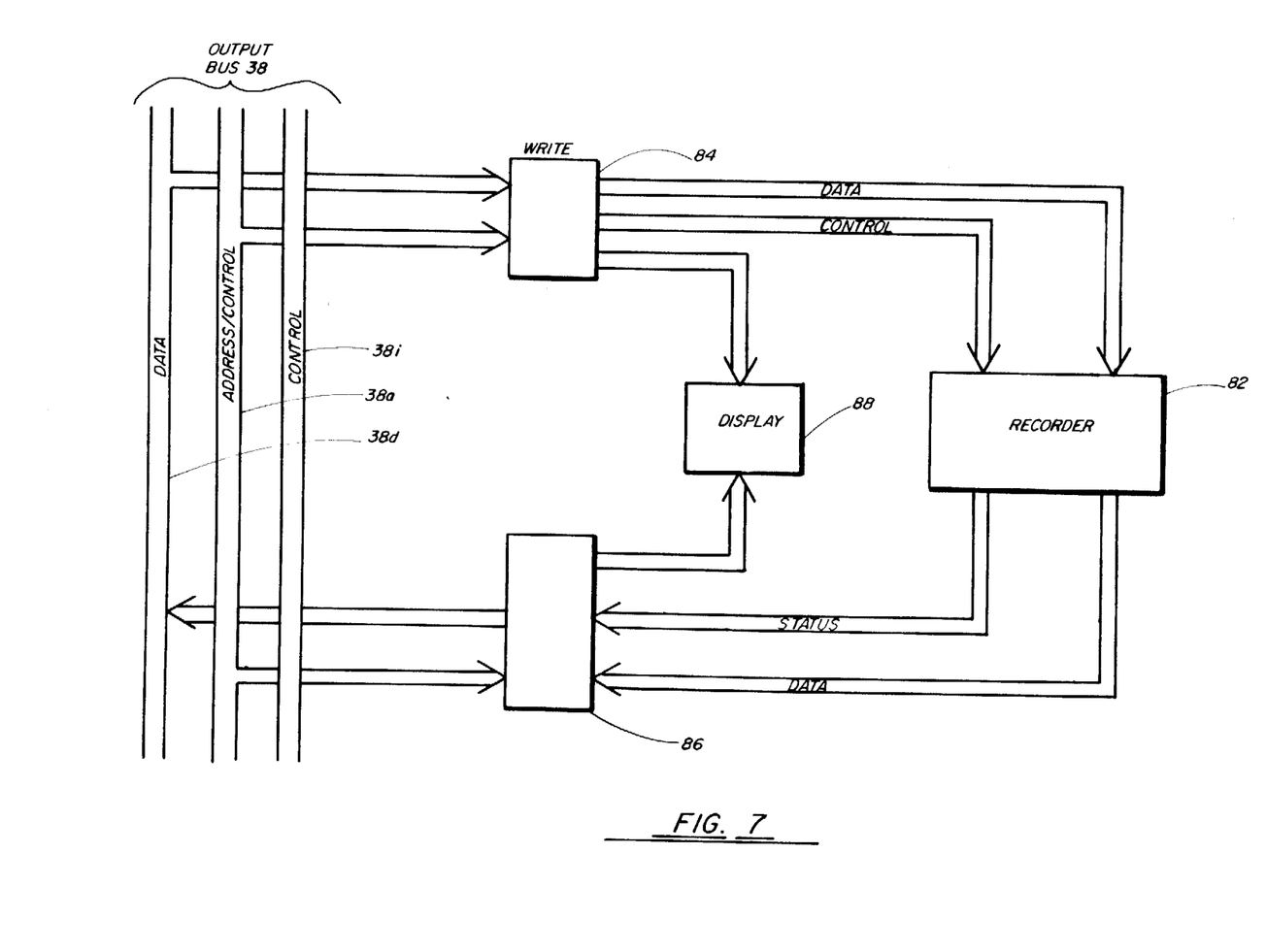
FIG. 7 is a block diagram of a bi-directional digital recorder for the split-BUS multiprocessor system.

FIG. 7 illustrates a digital recorder 82 connected to the output BUS 38. Depending upon the desired operation either a write buffer 84 or a read buffer 86 is addressed. Digital data is then either written onto the recorder 82 or read from the recorder under control of the output microprocessor 38. A recorder display 88 provides the operator with a visual status of the recorder 82.

Figure 8:
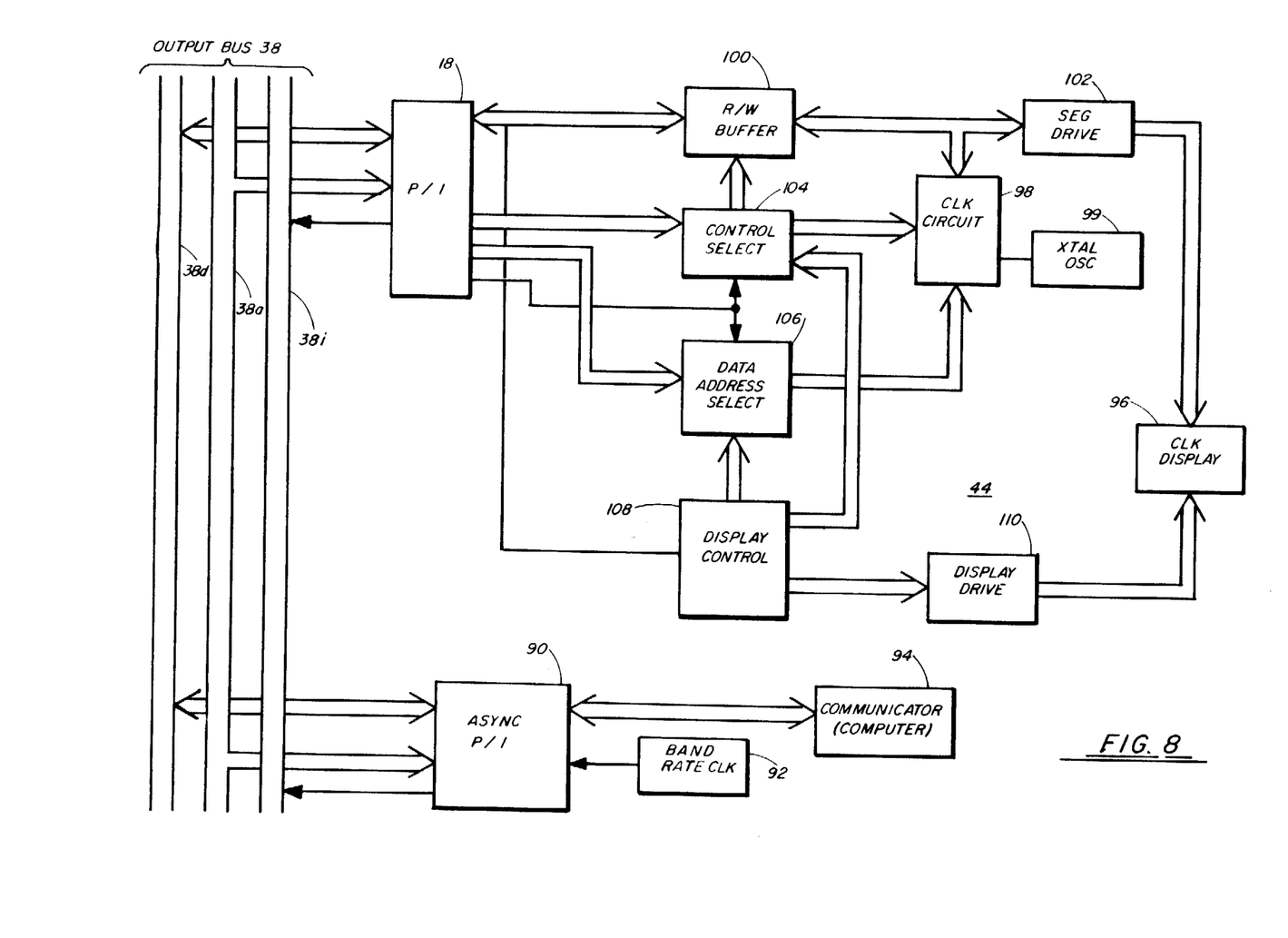
FIG. 8 is a block diagram of a realtime clock and a bi-directional communicator for the split-BUS multiprocessor system.

FIG. 8 shows an asynchronous communications peripheral interface adaptor 90 connected to the output BUS 38. A baud rate clock 92 controls the timing of the asynchronous P/I adaptor 90. A communicator 94 such as a digital computer is connected to the asynchronous P/I adaptor 90. The communicator 94 can interrupt the output microprocessor 36 and have the data from the digital recorder 82 played out, providing a primary equipmet-to-equipment interface.

Also shown in FIG. 8 is the realtime clock 44. Normally the realtime clock 44 interrupts the output microprocessor constantly to update a clock display 96 which is connected to the peripheral interface adaptor 18 directly. However, this ties up the output microprocessor 36 unnecessarily. Therefore, the present circuit provides a means for activating the clock display 96 without interrupting the output microprocessor 36 except when data is being received and processed. A clock circuit 98 controlled by a crystal oscillator 99 provides a plurality of time outputs such as 1.024 kHz, 1/sec, 1/min or 1/hour. The time outputs are passed through a read/write buffer 100 to the peripheral interface adaptor 18 for output on the output BUS 38. The time outputs also are input to a segment driver 102 to drive the segments of the clock display 96. A control select circuit 104 selects either the read or write function of the read/write buffer 100, and selects whether the clock circuit 98 time outputs are controlled by the output microprocessor 36 or are internal to the realtime clock 44. A data address select circuit 106 is connected to the clock circuit 98 to determine the time outputs. A display control circuit 108 drives the clock display 96 to display either hours/minutes/seconds or date/month/year. The display control circuit 108 also provides the internal data address to the data address select circuit 106. During normal operation the output processor 36 enables the realtime clock 44 to output on the output BUS when responding to periodic interrupts, the interrupt rate being set by the output microprocessor. The clock display 96 is driven independently of the output microprocessor 36.

Figure 9A:
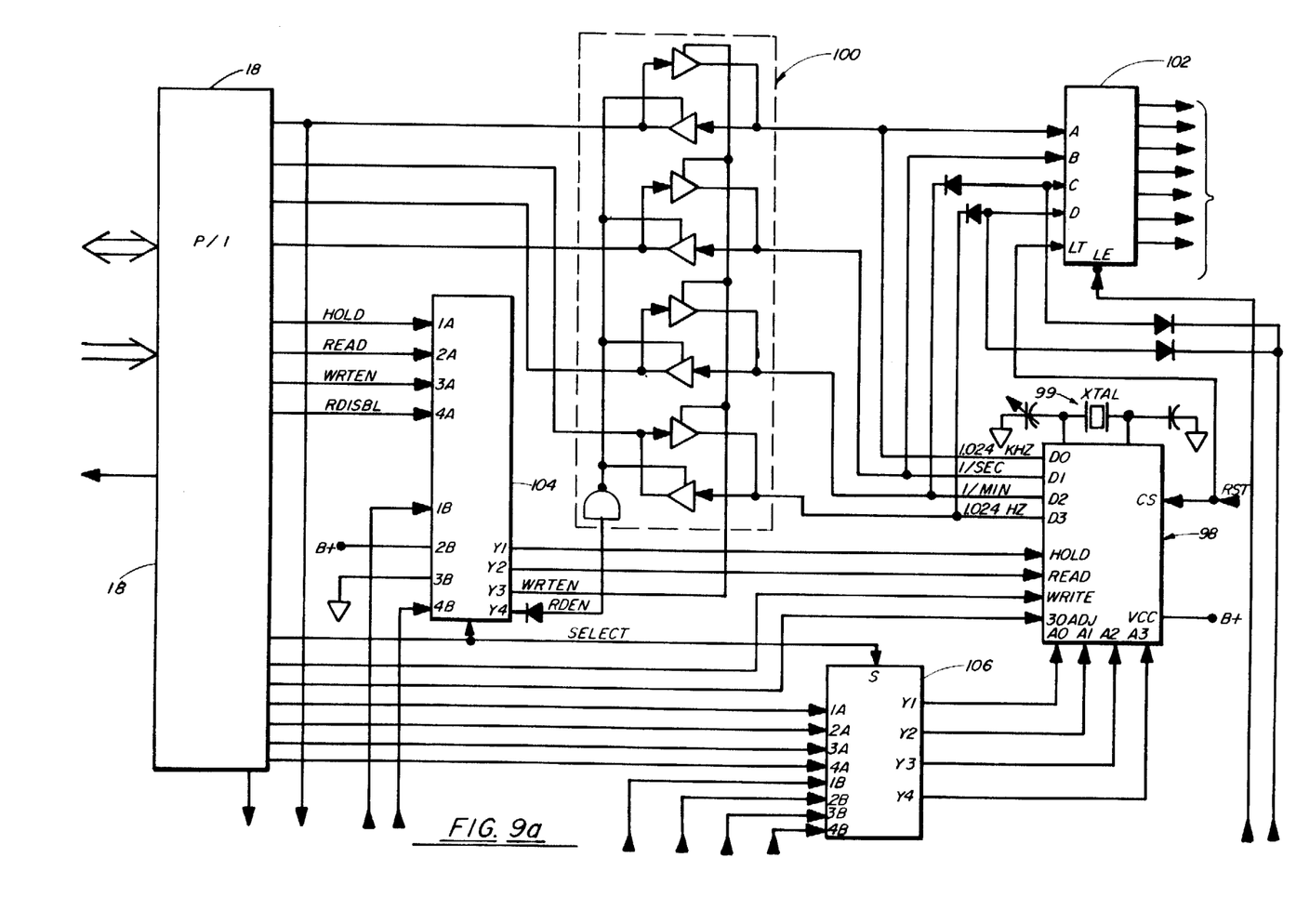
Figure 9B:
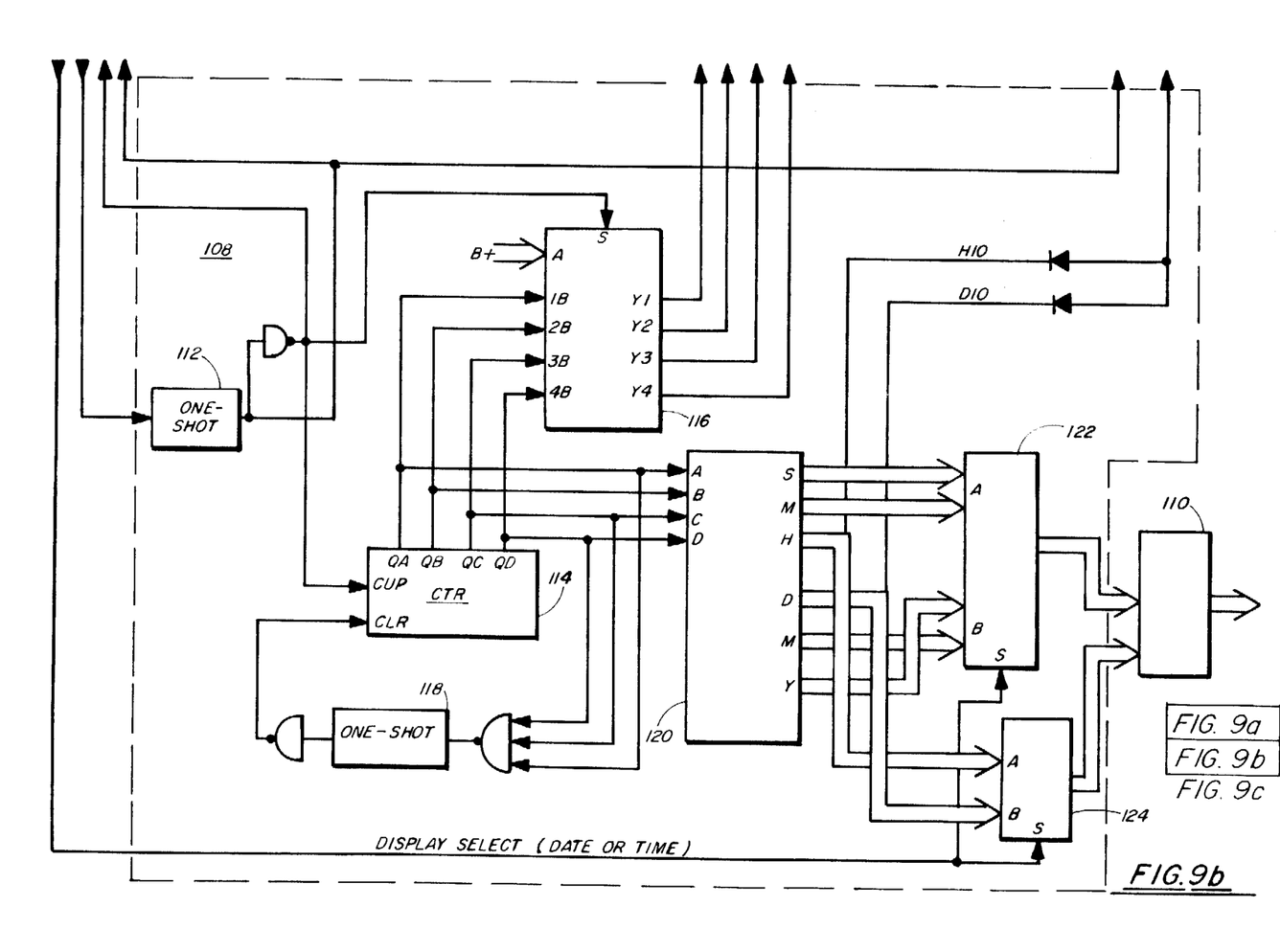

The realtime clock 44 is shown in greater detail in FIG. 9. The control select circuit 104 is an electronic switch with inputs from the output microprocessor 36 via the peripheral interface adaptor 18 on one pole and with internal inputs on the other pole. The data address select circuit 106 also is an electronics switch with the data address from the output microprocessor 36 on one pole and with an internally generated data address on the other pole. When the output microprocessor 36 is responding to a realtime clock interrupt a select line selects the "A" pole of the electronic switches 104, 106 so that the output microprocessor has control of the realtime clock 44. Otherwise, the realtime clock 44 operates independently and generates its own clock display. The "B" pole of the control select circuit 104 is partially hard wired to disable the write portion of the read/write buffer 100 and to place the clock 98 in a read configuration only.

A one-shot circuit 112 generates a pulse for each cycle of the 1.024 kHz time line from the clock 98. One output of the one-shot circuit 112 disables the read function of the read/write buffer 100 via the control select circuit 104, clocks an up-counter 114 and switches a display switch 116 to pass the address of the up-counter to the data address select switch 106. The display switch 116, thus, selects between the time output and the display digits of the clock circuit 98. A second output of the one-shot circuit 112 disables the write function of the read/write buffer 100 to effectively remove the read/write buffer from the circuit, and enables the segment driver 102 to pass data from the clock circuit 98 to the clock display 96. The address of the clock circuit 98 selected determines whether the regular time signals are output, or whether sec/min/hr or date/mon/yr is output. For the internal display one of the latter outputs is selected. A second one-shot 118 resets the up-counter 114 when all the used addresses are cycled through to start the address cycle again. The display data ripples through so quickly, that to an observer the clock display 96 appears as a steady time or date.

A time select gate 120 also receives the address from the up-counter 114 and outputs the type of data present at that address. Two time select switches 122, 124 act as a single switch, the output of which is a signal to the display driver 110 to display either time or date. The switches 122, 124 are controlled by a command input by the operator via the Keyboard 78. The output microprocessor 36 sets the display select line to display time until the operator selects date. When the operator selects date, the output microprocessor 36 after a preset time period resets the display select line to display time again.

Figure 10:
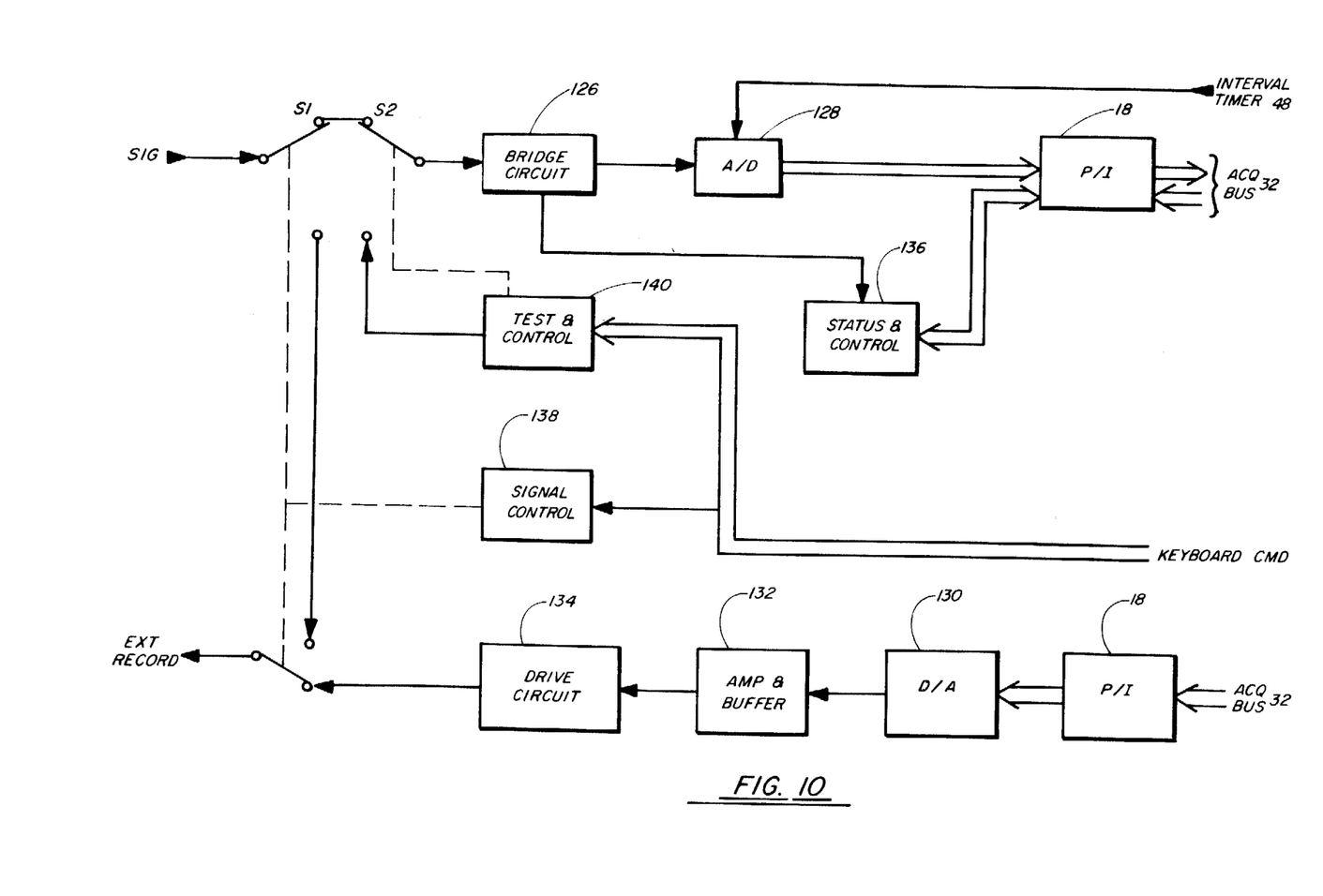
FIG. 10 is a block diagram of a shipboard front end electronics for the split-BUS multiprocessor system.

FIG. 10 shows how the split-BUS multiprocessor 16 can be inserted into a conventional sensor analog recording system with an appropriate front end electronics circuit. As switches S1 and S2 are shown a sensor input SIG is detected by a bridge circuit 126 or other suitable detector. The analog signal from the bridge circuit 126 is digitized by an analog-to-digital converter 128 which is under the control of the interval timer 48. The digitized data is transferred to the acquisition BUS 32 via the peripheral interface adaptor 18 for processing by the acquisition microprocessor 30. The processed digitized data is returned from the acquisition BUS 32 by another peripheral interface adaptor 18 to a digital-to-analog converter 130. The output analog signal is amplified and buffered by an amplifier and buffer circuit 132 before being transmitted by a drive circuit 134 to an external analog recorder. A status and display circuit 136 receives status from the bridge circuit 126 and commands from the acquisition processor 30 via the P/I adaptor 18, and transmits status to the P/I adaptor. An operator command via the Keyboard 78 controls a signal control circuit 138 for switch S1. With S1 in the opposite position SIG is recorded directly on the external analog recorder as previously. A test and control circuit 140 controls switch S2 to calibrate the bridge circuit 126. A keyboard command drives the test and control circuit 140.

Figure 11:
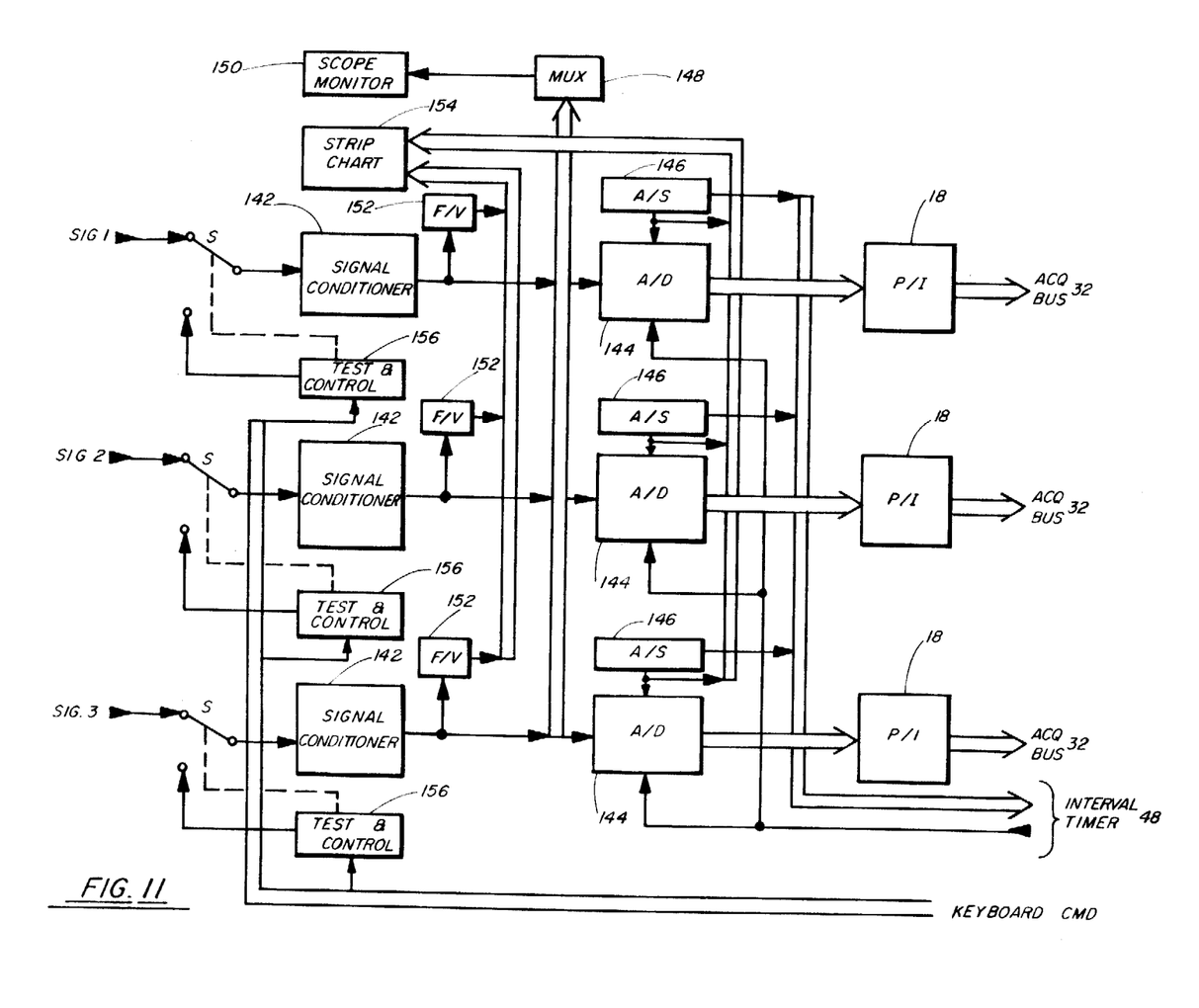
FIG. 11 is a block diagram of a multi-channel front end electronics for the split-BUS multiprocessor system.

FIG. 11 shows a multi-channel front end electronics circuit for the split-BUS multiprocessor system 16. The various input signals SIG 1, SIG 2 or SIG 3 may be telemetered data received from different sensors. A signal conditioner 142 receives the input signal and transfers it to an analog-to-digital converter 144 such as a period counter which is controlled by the interval timer 48. An auto start circuit 146 provides an input to the interval timer 48 to start the interval pulses and clears the A/D converter 144 when the system is initialized. The analog data from the signal conditioner 142 also may be input to a multiplexer 148 for display of each input signal on a oscilloscope 150. The analog signals additionally may be converted from a frequency to a voltage by a frequency-to-voltage converter 152 to drive a strip chart recorder 154. Additionally, the auto start circuit 146 provides synchronization for each strip of the strip chart recorder 154. A test and control circuit 156 enables each signal path to be tested and/or calibrated upon keyboard command by controlling the switch S at the input to each signal conditioner 142.

In operation a sensor unit, such as an XBT (expendable bathythermograph) probe for oceanographic studies, is prepared for launch by insertion into any suitable launcher. The split-bus multiprocessor system indicates that the sensor unit is loaded, ready for launch. The launch of the sensor unit starts the data acquisition sequence. The acquisition processor 30 starts the interval timer 48 and sends an interrupt to the output processor 36 to generate a header record which provides a history of the cast, or data acquisition sequence. When the output processor 36 completes the header record, it sets a flag in the data memory 42 to indicate to the acquisition processor 30 that the header is complete. The header record may include such information as time data, navigation data, surface temperature data, fall rate, type of sensor unit, sample rate parameters, comments, etc. Certain information from the header record is used to determine sample rate, cast duration, etc. The acquisition processor 30 then performs necessary calculations and begins reading the status of the sensor unit via the peripheral interface unit 18. As data is received, the acquisition processor 30 reads the data and stores it in the data memory 42. This continues until the cast is terminated.

The cast is terminated in one of three ways. First, the cast is terminated when the sensor unit connecting wire breaks. Secondly, the cast is terminated if the cast time predicted by the output processor 36, based upon the header information, is exceeded. Finally, the cast is terminated by the operator via the keyboard 78.

When the cast is terminated the acquisition processor 30 enters a wait state. The wait state gives the operator an opportunity to accept or reject the data acquired during the cast. After a preset time interval the data is accepted if there is no operator intervention. If the operator requires more time to make a decision, or desires to edit the header information, the wait state may be extended for a predetermined period upon keyboard entry. The operator at any time during the wait state may either accept or reject the data of the cast via keyboard entry.

If the data is accepted, the output processor 36 will transfer the data from the data memory 42 to the digital recorder 82. The output processor 36 then flags the acquisition processor 30 via the data memory 42 that the readout is complete. When the acquisition processor 30 subsequently polls the data memory 42, it then performs any additional calculations on the data. The new processed data is then readout by the output processor 36 as recited above.

The recorded data may be subsequently processed by another computer for detailed analysis. However, a digital computer 94 may interrupt the output processor via the asynchronous communication peripheral interface 90 to provide near realtime data processing by transferring the data from the digital recorder 82 to the computer. The computer 94, thus, interfaces with the output processor 36 just as the operator does via the keyboard 78. Since the header record can be modified at any time during a cast, the operator can change the sample rate, or the computer program can change the sample rate, of the interval timer 48 to provide more detailed data during portions of the cast, such as at ocean layer interfaces for oceanographic applications.

At the completion of the data processing and recording of the processed data, the split-bus microprocessor system is ready for another cast. Where multiple sensor units are used, the process is identical except that more than one cast may be processed simultaneously in a time-share type of operation. The acquisition processor 30 polls each sensor unit in turn, recording data from those units which are active. The data are stored in different areas of the data memory 42, and when a cast is complete the acquisition processor 30 interrupts the output processor 36 and sets a flag in the data memory so the output processor knows which of the multiple casts is completed.

Therefore, the present invention provides a self-contained split-bus microprocessor system for acquiring data from analog sensor units and recording it in a digital format for subsequent computer processing and analysis, which may be near realtime if the computer is connected directly to the system.

What is claimed is:

1. A split BUS, plural processor system for managing the flow of digital data from a plurality of peripheral sources to one or more utilization devices, said system comprising:

acquisition processor for controlling data acquisition functions of said system;

output processor for controlling data output functions of said system;

a plurality of sources of digital data each including an analog to digital converter; at least one digital data utilization means;

an acquisition program memory connected to said acquisition processor means and accessible thereby for providing acquisition program signals thereto;

an output progam memory connected to said output processor means and accessible thereby for providing output program signals thereto;

a plurality of first peripheral interface means each connected to one of said sources;

at least one second peripheral interface means connected to said digital data utilization means;

data memory means for temporarily storing and reading out digital data from said sources;

split BUS means comprising acquisition BUS means interconnecting said first peripheral interface means, said acquisition processor, and said data memory means for digital data flow therebetween, and output BUS means interconnecting said second peripheral interface means, said data memory means, and said output processor for digital data flow therebetween;

system clock means for providing first and second clock signal outputs, said first and second clock signals being out of phase with one another;

said acquisition processor and said output processor each being responsive to said first and said second clock signal outputs so as to avoid interferring access to said data memory means or other means common to both of said acquisition and output BUSes;

internal times means, connected to said acquisition BUS and is set by said acquisition processor to provide data sample rate signals to said analog to digital converter of a respective source for generation of digital data to be stored in said data memory means;

said acquisition processor being operative to successively poll said first peripheral interface means for sources ready to provide data, to transmit a data ready enabling signal to said interval times means so that data from a ready source is sampled at a predetermined rate for entry into said data memory means, and to indicate completion of storage of such data by transmitting an interrupt signal to said output processor;

said output processor being responsive to said interrupt signal to read the corresponding stored data out of said data memory means to said second peripheral interface means for transmission to said utilization means and to place a flag in said data memory means to indicate to said acquisition processor that the data memory means is again ready to receive data from one of said first peripheral interface means; and said acquisition processor being responsive to said flag when it next polls the data memory means to resume polling of said first peripheral interface means for sources ready to provide data, whereby said system operates in a time-sharing manner to acquire, store, and read out data from a plurality of sources to one or more utilization means.

2. A split BUS, plural processor system as defined in claim 1, and wherein:
said acquisition BUS means comprises a first data BUS and a first address and control BUS;
said output BUS means comprises a second data BUS, a second address and control BUS, and an interupt BUS.

3. A split BUS, plural processor system as defined in claim 2, and wherein said data memory means comprises:
a plurality of memory blocks;
a first bi-directional data buffer coupling said first data BUS and said memory blocks;
a second bi-directional data buffer coupling said second data BUS with said memory blocks;
a first memory control circuit connected to said first address and control BUS and responsive to a data ready signal thereon to generate a plurality of data storage enabling control signals;
a second memory control circuit connected to said address and control BUS and responsive to conditioning of said output processor by an interrupt signal to generate a plurality of data read out enabling control signals;
a first memory block select circuit connected to said plurality of memory blocks;
a second memory block select circuit connected to said plurality of memory blocks;
a first address buffer coupling said first address and control BUS with said memory blocks and said first memory block select circuit;
a second address buffer coupling said second address and control BUS with said memory blocks and said second memory block select circuit;
said first bi-directional data buffer, said first address buffer, and said first memory block select circuit being responsive to said data storage enabling control signals to direct storage of data from a data ready one of said first peripheral interface means at an sources at address in a selected memory block; and
said second bi-directional data buffer, said second address buffer, and said second memory select circuit being responsive to said data readout enabling control signals to read out data from an address in a selected memory block to directed one of said utilization means.

* * * * *